United States Patent [19]
Cozert, Jr.

[11] 3,765,208
[45] Oct. 16, 1973

[54] MOLD KNURLING TOOL
[75] Inventor: Albert J. Cozert, Jr., Durham, N.C.
[73] Assignee: Owens-Illinois, Inc., Toledo, Ohio
[22] Filed: Mar. 6, 1972
[21] Appl. No.: 231,891

[52] U.S. Cl. ........................ 72/81, 72/208, 72/370, 72/446, 72/703, 82/14 A
[51] Int. Cl. ...................... B21d 22/00, B21b 17/02
[58] Field of Search ...................... 72/703, 481, 81, 72/82, 84, 83, 208, 370, 446; 82/14 A, 36 R, 36 A, 36 B; 113/120 H, 120 M; 287/56, 107, 119, 53 TK

[56] References Cited
UNITED STATES PATENTS

| | | | |
|---|---|---|---|
| 3,490,258 | 1/1970 | Paitchell | 72/83 |
| 3,145,677 | 8/1964 | Sporck | 72/83 |
| 3,064,503 | 11/1962 | Fry | 287/53 TK |
| 3,498,653 | 3/1970 | McCreery | 287/119 R |
| 3,622,206 | 11/1971 | Krekeler | 287/119 R |
| R21,544 | 8/1940 | Richard | 82/14.1 |
| 1,847,794 | 3/1932 | Takeda | 72/83 |
| 1,262,780 | 4/1918 | Griffin | 72/83 |
| 3,541,902 | 11/1970 | Weaver | 82/14 A |

Primary Examiner—Charles W. Lanham
Assistant Examiner—M. J. Keenan
Attorney—Steve M. McLary et al.

[57] ABSTRACT

A knurling tool having a fixed knurl bar and multiple, interchangeable tool bars for use in conjunction with a lathe. Molds for forming glass containers are knurled on their interior surfaces by a knurling wheel while being rotated by a lathe. The configuration of the mold cavity requires the knurling wheel to be positioned at three separate angles during the process. The knurl bar is properly aligned with respect to the mold, and a tool bar carrying a knurlng wheel is inserted for the first knurling operation. After the first operation, the tool bar is removed and a new tool bar, having the proper angle for the next knurling operation, is inserted. This procedure is repeated for the third knurling operation using a third tool bar having yet a third angle.

5 Claims, 9 Drawing Figures

MOLD KNURLING TOOL

BACKGROUND OF THE INVENTION

This invention relates to knurling tools. More specifically, this invention relates to a knurling tool having multiple, interchangeable tool bars and the process of knurling with multiple bars. Most particularly, this invention relates to a knurling tool having multiple, interchangeable tool bars of differing angles for knurling separate areas within the cavity of a glass container mold.

In the manufacture of glass container molds, it is frequently necessary to knurl three areas of the mold cavity, namely, the heel, body, and shoulder regions. To do this, the mold is chucked in a lathe and rotated while a knurling tool is brought into contact with the proper area. The process as it is now done uses three separate knurl bars, each bar being bent at the end which carries the knurling wheel at the angle necessary to contact one of the areas mentioned. It can be seen that only one area at a time can be knurled for any set of molds. It is well known that setting up lathe tooling, such as a knurl bar, is a matter requiring skill and time. Thus, once set properly, a knurl bar will not be removed from the lathe until all of the molds in a set (molds are normally manufactured in sets of twenty or more individual molds) have been knurled in the area accessible by the knurling tool of that particular setup. Then, a new knurl bar will be properly aligned on the lathe, the new knurl bar being bent at an angle which can reach a section of the mold cavity not accessible by the first knurl bar. This procedure would then be repeated for a third area of the mold cavity. It should be clear that this system requires three setups of the lathe and six handlings of each mold in the set. I have devised a knurl bar with interchangeable tool bars such that the lathe need be set up only once for each set of molds and each mold in the set need be handled only twice. The resulting improvement in efficiency of the operation has been as much as 100 percent in some cases.

SUMMARY OF THE INVENTION

This invention is an apparatus and method for knurling a plurality of areas within the cavity of a glass forming mold in which each of the areas is positioned at a unique angle with respect to the longitudinal axis of the mold. A knurl bar having a socket in one end is positioned in a lathe tool holder with the socket facing the mold cavity. The mold itself is mounted in a fixture on the lathe face plate for rotation.

A set of plural, interchangeable tool bars carry a knurling wheel on one end thereof for making the knurling cut in the mold cavity. The ends of the tool bars carrying the knurling wheel are each set at a different angle generally parallel to one of the unique areas to be knurled. Thus, a set of tool bars is defined which, in sum, is generally parallel to all of the unique areas to be knurled. The opposite ends of the tool bars are shank portions which are detachably engageable with the knurl bar socket. In operation, the stylus of a lathe tracing attachment is aligned with the position of a first one of the plural tool bars, engaged with the knurl bar, with respect to a first area to be knurled. After knurling the first area, the first tool bar is removed, and a second tool bar engaged with the knurl bar. The second knurl bar is inclined at a unique angle to knurl a second area of the cavity. The second area may then be knurled without resetting the lathe tracing attachment.

DETAILED DESCRIPTION OF THE DRAWINGS

Figure 1:
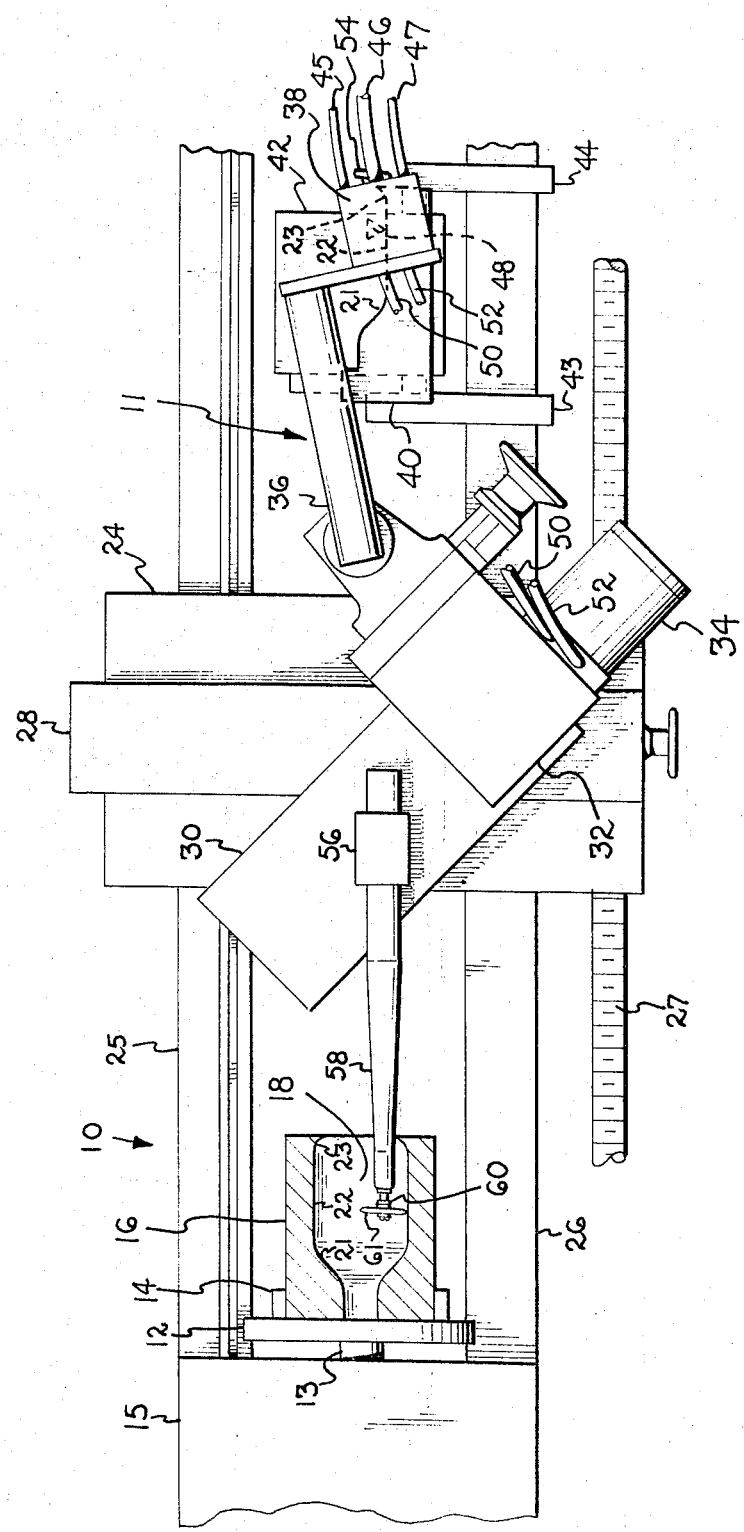
FIG. 1 is a top, plan view, partially schematic, of the apparatus of the present invention in place on a lathe.
Figure 2:
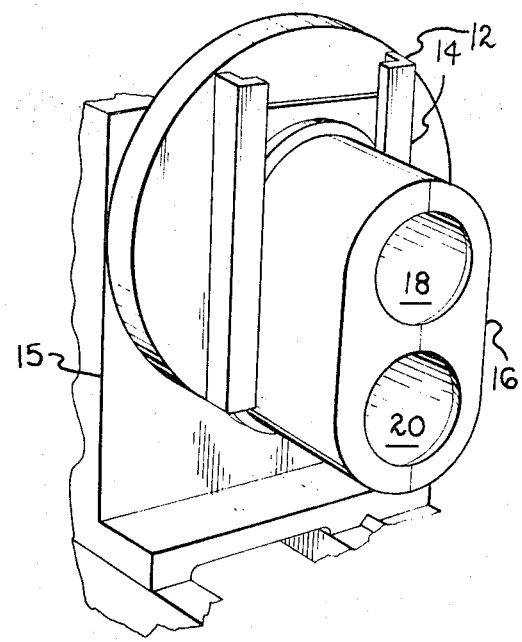
FIG. 2 is a perspective view of a glass forming mold in position on the face plate of the lathe shown in FIG. 1.

FIG. 1 shows a portion of an ordinary metal working lathe 10 under the control of a tracing attachment 11. The tracing attachment 11 is of the type well known to those skilled in the metalworking arts, and may be a Mimik Model 9000, manufactured by Retor Developments, Ltd., Galt, Ontario. The operation of such tracing attachments 11 is such that a stylus will follow the contours of a profile to be cut and control the cutting tool carried by the lathe. Since this operation is so well known, the parts of the tracing attachment 11 are only schematically shown in FIG. 1 for the purposes of clarity and understanding the functioning of the present invention. The face plate 12 of the lathe 10 serves to carry a mold holding fixture 14. The face plate 12 is driven through a spindle 13 driven by the lathe head stock 15. A dual cavity glass forming mold 16 is shown held by the fixture 14 to the face in position to be knurled. It will be noted in FIG. 1 that the mold 16 is shown in cross section so that the interior cavity of the mold may be seen. This is done in order to explain the functioning of the apparatus of the present invention. However, it can be appreciated, by reference to FIG. 2, that the glass mold 16 actually is made up of two independent dual cavities 18 and 20. Within each of the cavities 18 and 20, there are three distinct regions which must be knurled and whose knurling is accomplished most efficiently by the present invention. These three areas are the shoulder portion 21, the body portion 22, and the heel portion 23. The three locations given are by way of example, and it may be appreciated that, depending on the configuration of the cavities of the mold 16, more or less than the three locations noted might be knurled.

The lathe 10 is of conventional construction, in which a carriage 24 is guided by ways 25 and 26 and driven by a screw drive 27. Mounted on the carriage 24 is a cross slide 28 and a compound 30. The compound 30, in this situation, is under the control of the tracing attachment 11. Since the functioning of the tracing attachment 11 is familiar to those skilled in the metal-working arts, the tracing attachment 11 is shown in a schematic form and some details are omitted. In addition, some features of the tracing attachment 11 are shown in phantom lines for the purposes of clarity in the explanation of its functioning. A mounting bracket 32 for the tracing attachment 11 is mounted on the compound 30. The mounting bracket 32 has attached to it a power cylinder 34. It is the power cylinder 34 which, of course, controls the movement of the compound 30. Extending from the mounting bracket 32 is a support arm 36, which serves to carry a main control valve 38. The main control valve 38 is supported above a template 40 whose contour will be followed by this lathe. It may be seen that the template 40 is precisely contoured to duplicate the interior surfaces of the mold 16. Thus, there may be seen, on the template 40, areas corresponding to the neck portion 21, body portion 22 and heel portion 23. The template 40 is carried by an adjustable holder 42, which is supported from the lathe way 26, by two brackets 43 and 44. The main control valve 38 is supplied by a source of hydraulic fluid under pressure through hydraulic lines 45, 46 and 47 from a source not shown. A tracing stylus 48 extending below the valve 38 will follow the designated contours of the template 40 and, in so doing, will proportion the outward flow of hydraulic fluid from the control valve 38. The flow of hydraulic fluid from the control valve 38 is to and from the power cylinder 34, which has inlet and outlet lines 50 and 52. It is, of course, understood, that the lines 50 and 52 connected to the power cylinder 34 are likewise connected to the main control valve 38 to receive the proportioned hydraulic fluid controlled by the position of the tracing stylus 48 on the template 40. The lines 50 and 52 have been interrupted for purposes of clarity.

The adjustable holder 42, which carries the template 40, may be adjusted by moving a handle 54. The handle 54 is connected to the adjustable holder 42 in such a manner that the template 40 be moved longitudinally with respect to the holder 42. This function is well known to those skilled in the art and is for the purposes of aligning any cutting tools carried by the lathe 10.

In FIG. 1, the lathe compound 30 carries a tool holder 56. The tool holder 56, in turn, carries a knurl bar 58. Mounted on the end of the knurl bar 58 is a tool bar 60, which serves to carry a knurling wheel 61. It will be noted in FIG. 1, that the position of the tracing stylus 48 on the contour of the template 40 is substantially the same position as that of the knurling wheel 61 in the cavity 18. This, of course, is correct, since it is the function of the tracing attachment 11 to guide a working tool, such as the knurling wheel 61, along the contour of the part to be machined, such as the glass mold 16. It further will be understood that, in operation, the glass mold 16 is rotated by the lathe face plate 12 through the spindle 13, and the knurling wheel 61 is additionally rotatably mounted on the end of the tool bar 60. Thus, as the glass mold 16 is rotated, the knurling wheel 61 will, in effect, contact the entire circumference of the glass mold 16 and trace a line. To achieve the longitudinal knurling of a particular area, the tracing attachment 11 is engaged, and the tracing stylus 48, following the contours of the template 40, will control the position of the knurling wheel 61 as it is withdrawn from the cavity 18 of the mold 16. It should be appreciated from viewing FIG. 1, that the tool bar 60 shown would not be able to properly position the knurling wheel 61 on the neck portion 21 or on the heel portion 23 for knurling. It is well known that the axis of the knurling wheel 61 must be substantially perpendicular to the surface being knurled to obtain proper results. The operation of the tracing attachment 11 is such that the angle of inclination of the knurling wheel 61 with respect to the center axis of the mold 16, cavity 18, cannot be changed. That is, the motion controlled by the template 40 will only be at right angles with respect to the axis of the mold 16. Therefore, if the configuration of the tool bar 60 and knurling wheel 61 shown in FIG. 1 were allowed to be moved under the control of the template 40 to the heel area 23, the tracing attachment 11 would cause the knurling wheel 60 to be moved outward along the contour of the heel area 23 in conformity to the movement of the stylus 48 on the template 40, but the angle of the axis of the knurling wheel 61 with respect to the heel portion 23 would not be perpendicular, thus leading to a poor knurling operation The problem just described has been solved in the prior art by the use of sets of knurling bars 58, which had their ends bent at a preselected angle necessary to properly knurl the heel portion 23 and neck portion 21. The angle of inclination of the end of the knurling bar 58 was such that when a knurling wheel 61 was attached thereto, the axis of the knurling wheel 61 would remain substantially perpendicular to the area which was being knurled at that time. The tracing attachment 11, as shown in FIG. 1, is substantially the same arrangement used in the prior art. However, it may be appreciated that in the prior art, three separate and distinct knurling bars 58 would be required, each with an and bent at the proper angle for knurling a specified area. The procedure followed in the prior art would involve first placing a knurl bar 58 having its end bent at an angle to receive a knurling wheel 61 which would knurl the heel area 23 in the tool holder 56. The knurling wheel 61 would be properly positioned in the cavity 18 to begin the cut, and then the template 40 would be positioned by use of the handle 54 until the stylus 48 was in the corresponding position with the knurling wheel 61. Then, the lathe would be started, and the heel portion 23 of the upper cavity 18 would be knurled. At this point, the mold 16 would be indexed upward in the fixture, and the heel portion 23 of the lower cavity 20 would be knurled. Next, the mold 16 would be removed from the fixture 14, and a new mold 16 inserted and the knurling procedure repeated. Once the stylus 48 had been set at the proper position on the template 40 with respect to the actual positioning of the knurl bar 58 with respect to the mold 16, additional compensation would not be required for a number of molds to be knurled in the heel area 23. Thus, all of the glass molds 16 of a particular lot would be first knurled in the heel area 23. As an example, a glass molds 16 of this nature are commonly finished in lots of, for example, twenty molds 16. It may therefore be appreciated that each of the twenty molds would have to be placed on and taken off of the fixture 14 for each knurling operation. After the heel area 23 of each mold 16 in the lot had been knurled, the original knurl bar 58 would be removed from the tool holder 56, and a new knurl bar 58 inserted with its end set at the proper angle to knurl the body portion 22. This angle would be substantially parallel with the axis of the mold 16, such as that shown in FIG. 1. The difficulty with the prior art procedure arises at this point. The new knurl bar 58 could seldom be placed in position in the tool holder 56 with sufficient accuracy to match the position of the original knurl bar 58. Thus, it would be necessary to again adjust the template 40, by using the adjusting handle 54, with respect to the stylus 48 to achieve correspondence between the actual position of the new knurling wheel 61 and the stylus 48 on the template 40. Once this has been achieved, the knurling of the body portion 22 would proceed as described for the heel portion 23. Finally, a third knurl bar 58 would be inserted and, again, the alignment procedure previously described would be required to align the third knurl bar 58 with the neck portion 21. It may therefore be appreciated that each mold in a set of molds would have to be handled a total of six times, and it would be necessary to set up a knurl bar 58 three separate times. Those skilled in the metalworking arts can readily appreciate that the setup time for any tool on a lathe is an appreciable portion of the time required to accomplish the total task. In addition, the handling of each mold six times further slows the overall production rate of knurling the glass molds 16.

Figure 4:
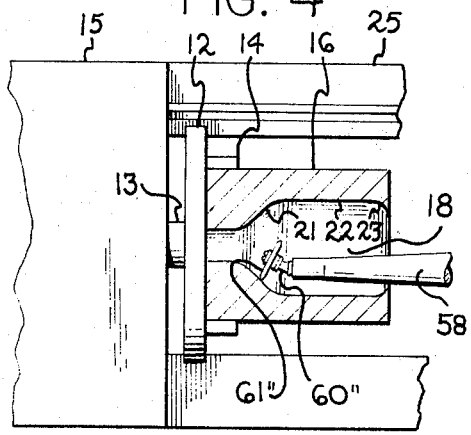
FIG. 4 is a view similar to FIG. 3 showing the present invention in position to knurl the neck area of a glass forming mold.
Figure 3:
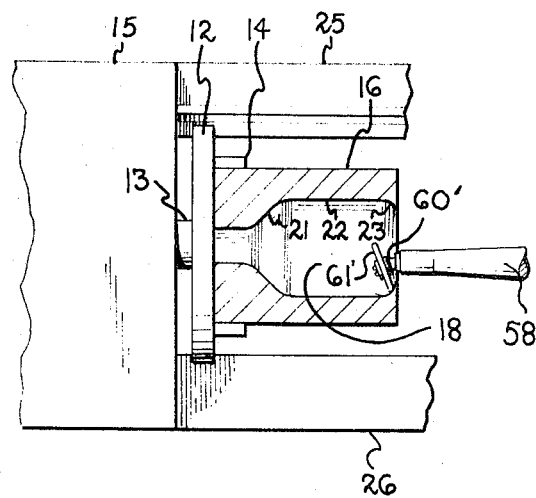
FIG. 3 is a top, plan view of a portion of FIG. 1 showing the present invention in position to knurl the heel area of a glass forming mold.

The apparatus of the present invention eliminates the multiple handling of the glass molds 16 and requires only a single alignment of the knurl bar 58. This apparatus may best be illustrated by reference to FIGS. 3 and 4, keeping in mind the illustration of FIG. 1. To begin the procedure, a tool bar 60' is inserted in the knurl bar 58. The knurl bar 58 is then clamped in position by the tool holder 56. At this point, the single alignment procedure necessary for knurling an entire set of molds 16 is performed. The template 40 is adjusted, using the handle 54, until the stylus 48 is in the position on the template 40 corresponding to the actual position in the cavity 18 of the knurling wheel 61' carried by the tool bar 60'. At this time, the heel portion 23 of the mold 16 may be knurled in the manner previously described with reference to the prior art. That is, the mold 16 is rotated by the lathe face plate 12, and the upper cavity 18 and the lower cavity 20 are knurled in sequence. It may be appreciated from FIG. 3 that the knurling wheel 61' is inclined at an angle by the tool bar 60', which makes the knuring wheel 61' substantially perpendicular to the heel portion 23 that is to be knurled. After knurling the heel portion 23 of a single mold 16, the knurl bar 58 is completely withdrawn from the mold cavity 20. The tool bar 60' is removed from the end of the knurl bar 58 and a new tool bar 60 carrying a new knurling wheel 61 is inserted in position. This would be the tool bar 60 that may be seen in FIG. 1. The advantage to the present apparatus may now readily be seen. The knurl bar 58 may be moved back into position within the cavity 18 of the mold 16 and the alignment of the knurl bar 58 with respect to the stylus 48 on the template 40 is not lost. In the prior art, changing from one angle of knurling wheel 61 to another required changing the entire knurl bar 58, thus leading to the loss of positioning of the knurling wheel 61 with respect to the stylus 48 position on the template 40. By leaving the knurl bar 58 locked in position in the tool holder 56, the positional inter-relationship of the knurling wheel 61 and the stylus 48 are retained; there is no need to readjust the position of the template 40. Continuing the operation, the body section 22 would then be knurled in both cavities 18 and 20 of the mold 16 using the new tool bar 60 and knurling wheel 61. Finally, the knurl bar 58 would again be retracted from the cavity 20, and a third tool bar 60'' carrying a third knurling wheel 61'' would be inserted and locked in position. The stylus 48 is still in the proper position on the template 40 with respect to the actual position of the knurling wheel 61'' to allow the knurl bar 58 to again be inserted into the cavity 18 to allow knurling of the neck portion 21 by the third knurling wheel 61'' carried by the third tool bar 60''. It may again be seen from FIG. 4, that the third knurling wheel 61'' is inclined at an angle, determined by the third tool bar 60'', that is substantially perpendicular to the neck portion 21 of the contour of the mold cavity 18. After knurling the neck portion 21 of both cavities 18 and 20 of a single mold 16, the mold 16 is completed and may be removed from the fixture 14. A new mold 16 may be remounted on the fixture 14, and the tool bar 60' re-inserted in the knurl bar 58. Again, there is no need to realign the position of the template 40 with respect to the stylus 48 to achieve proper correspondence with the actual position of the knurling wheel 61'. This procedure may be repeated for the three areas, 21, 22 and 23 of the new mold 16. It may be appreciated now that each mold 16 in a set of molds is handled only twice. This is in sharp contrast to the six handlings required in the procedure followed in the prior art. In addition, the knurl bar 58 is aligned only once, as contrasted with the triple alignment procedure required in the prior art.

Figure 5:
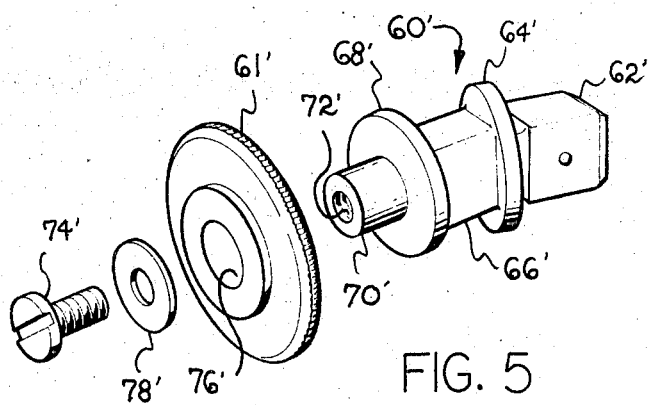
FIG. 5 is an exploded view of the tool bar and knurling wheel assembly of FIG. 3 on an enlarged scale.

FIGS. 5 through 9 illustrate the details of the attachment of the tool bar 60 to the knurl bar 58. FIG. 5 is an exploded view of the tool bar 60' illustrated in FIG. 3. The tool bar 60' has a shank portion 62' which is adapted to fit into a corresponding socket in the end of the knurl bar 58. Adjacent the shank portion 62' is an insertion stop ring portion 64' which seats the tool bar 60' at the proper depth in the knurl bar 58. Extending beyond the stop ring 64' is an angle bar portion 66'. The angle bar portion 66' is the portion of the tool bar 60' which determines the angle at which the knurling cut will be made within the mold cavities 18 and 20. The inclination of the angle bar portion 66' is, of course, constant for any particular tool bar 60' but a plurality of tool bars 60 are provided having various angles for their angle bar portions 66. This will allow any area within the mold cavities 18 and 20 to be properly knurled. Adjacent the angle bar portion 66' of the tool bar 60' is a wheel stop ring portion 68'. The wheel stop ring 68' serves to properly seat the knurling wheel 61'. The knurling wheel 61' is telescoped on an attachment shaft portion 70' attached substantially perpendicularly to the wheel stop ring 68'. The attachment shaft 70' has a threaded central bore 72' into which a screw 74' is threadably engaged through a central opening 76' in the knurling wheel 61' to secure the knurling wheel 61' to the attachment shaft 70'. In addition, a retaining washer 78' is generally used on the front face of the knurling wheel 61' to help center the knurling wheel 61' properly with respect to the threaded central bore 72'. Thus, it can be seen that the knurling wheel 61' is retained on the shaft 70' between the stop ring 68' and the washer 78'. It should be kept in mind that the knurling wheel 61' is rotatable with respect to the shaft 70'.

Figure 6:
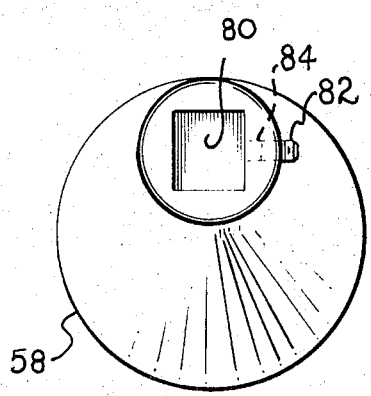
FIG. 6 is an end view of the knurl bar of the present invention.

FIG. 6 shows that the end of the knurl bar 58 is provided with a square socket opening 80 to allow insertion of the shank portion 62 of the tool bar 60. Although the socket 80 is shown as being square, it may be appreciated that the socket 80 may assume any configuration desired, such as round, hexagonal or octagonal. Of course, in such an event, the shank 62 of a tool bar 60 would have to be modified to fit the particular configuration of the socket 80. The only criterion is that the tool bar 60 should mount to the knurl bar 58 in a specific relative angular position so that the axis of the knurling wheel 61 is precisely located with respect to the axis of the knurl bar 58. In addition, FIG. 6 shows that the shank portion 62 is held in position in the socket 80 by means of a set screw 82 positioned in a threaded opening 84 through the knurl bar 58 into the socket 80.

Figure 7:
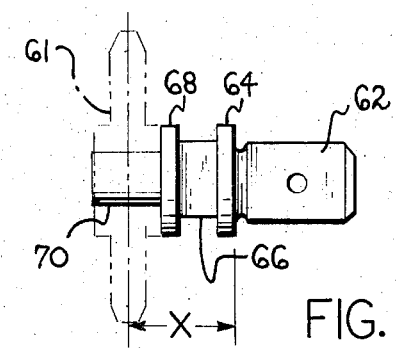
FIG. 7 is a plan view of the tool bar of FIG. 1 on an enlarged scale.
Figure 8:
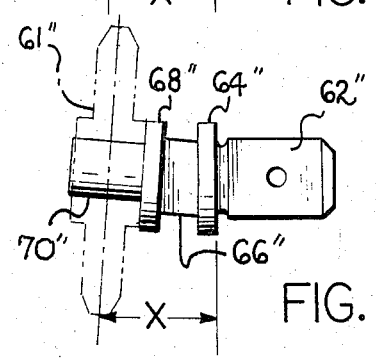
FIG. 8 is a plan view on an enlarged scale of the tool bar shown in FIG. 4.
Figure 9:
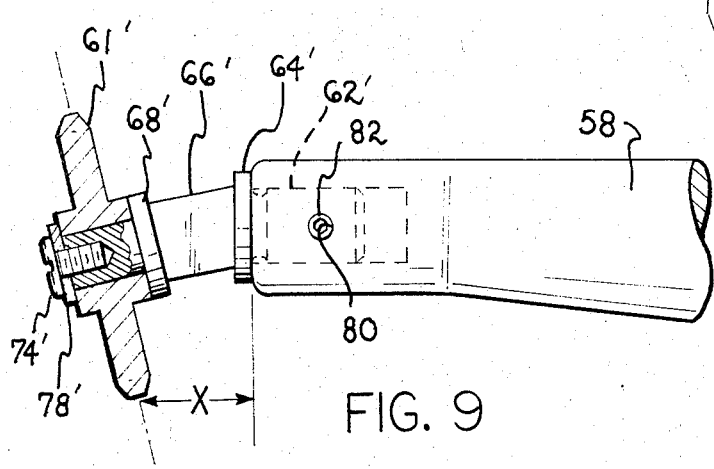
FIG. 9 is a plan view, partially in cross section, of the tool bar of FIG. 5 in place in the knurl bar of the invention.

FIGS. 7 and 8 illustrate two additional tool bars having different angles provided for with their angle bars. Portions corresponding to those previously described with respect to FIGS. 4 and 5 are given double prime numbers for FIG. 8, since this tool bar 60″ corresponds in general detail to that illustrated previously with respect to FIG. 4, and numbers given with respect to FIG. 7 are unprimed, since FIG. 7 illustrates the indentical tool bar 60 illustrated in FIG. 1. In particular, note that the angle bar 66 in FIG. 7 is substantially parallel with respect to the shank portion 62 and the attachment shaft 42. However, in FIG. 8, the angle bar 66″ is bent at an angle opposite that shown for the angle bar 66′ in FIG. 5. This, of course, is necessary, as may readily be seen with reference to FIGS. 4 and 5, to allow the knurling wheel 61″ to be properly positioned with respect to the neck portion 21. FIG. 9 shows the tool bar 60′ assembled in the knurl bar 58. It should be noted that it is clearly seen how the stop ring 64′ limits the engagement of the shank 62′ with the socket 80, and the wheel stop ring 68′ properly positions the knurling wheel 61′ with respect to the angle bar 66′.

It may be seen that the three tool bars 60, 60′ and 60″, in sum, comprise a set of tools which will allow knurling of three separate portions or areas 21, 22 and 23 of the mold 16. It is clear that each of the three portions 21–23 are inclined at a unique angle with respect to the longitudinal axis of the mold 16. The angle bar portions 66, 66′ and 66″ respectively are inclined at an angle generally parallel to the unique angles of the three portions 21–23 of the mold 16. Of course, the advantages of this invention would apply to as few as two portions within a mold or to a plurality of areas, if the mold cavity contours so required.

Particular attention is directed to the dimension noted as X in FIGS. 7, 8 and 9. The dimension X is the distance from the mold knurling contact points of the knurling wheels 61, 61′ and 61″ to the face of the knurl bar 58 which contains the socket 80. The dimension X is measured along a line parallel to the longitudinal axis of the knurl bar 58. The dimension X is a constant value for all three tool bars 60, 60′ and 60″ which make up the set of tools for knurling the three portions 21–23 within the mold 16. The constant dimension X is required to allow the cutting point of the knurling wheels 61, 61′ and 61″ to return to the same point in the cavities 18 and 20 during the sequential knurling operations. For example, assume that the heel portion 23 has been completely knurled. The knurling wheel 61, when fed into one of the cavities 18 or 20 to begin the knurling of the body portion 22, must begin at the exact point at which the knurling wheel 61′ stopped. This must occur, or the knurl pattern will be irregular. If the dimension X were not constant, the position of the stylus 48 on the template 40 would not correspond to the actual position of the knurling wheel 61′, thus destroying the advantage of the present invention which requires only one alignment of the stylus 48 with the template 40.

As an example of the time savings involved in using the present invention, the time required to knurl twenty sets of dual cavity molds 16 using the prior art method was 28 hours. Using the apparatus of the present invention, the same operation may be accomplished in only fourteen hours. Thus, there is a savings of 100 percent in time by the use of the present invention.

What I claim is:

1. A method for knurling a container defining cavity formed in a mold for forming glass containers, said mold being mounted on a fixture attached to the face plate of a metalworking lathe, comprising the steps of:
   a. mounting a knurl bar, having a tool receiving socket in the end of said knurl bar facing said mold, in a tool holder mounted on said lathe;
   b. inserting and locking a first tool bar carrying a first knurling wheel, set at an angle substantially perpendicular to a first portion of said cavity, in said socket;
   c. positioning said first knurling wheel in said cavity to begin a first knurling cut on said first portion of said cavity;
   d. aligning a template, shaped to duplicate the contour of said cavity, with respect to the position of said first knurling wheel to a stylus of a lathe tracing attachment;
   e. knurling said first portion of said cavity under the control of said tracing attachment;
   f. withdrawing said first knurling wheel from said cavity;
   g. removing said first tool bar from said socket;
   h. inserting and locking a second tool bar carrying a second knurling wheel, set at an angle substantially perpendicular to a second portion of said cavity, in said socket;
   i. knurling a second portion of said cavity under the control of said tracing attachment; and
   j. withdrawing said second knurling wheel from said cavity.

2. The method of claim 1, further comprising the steps of:
   a. removing said second tool bar from said socket;
   b. inserting and locking a third tool bar carrying a third knurling wheel, set at an angle substantially perpendicular to a third portion of said cavity, on said socket; and
   c. knurling a third portion of said cavity under the control of said tracing attachment.

3. A method for knurling both container defining cavities formed in a mold for forming glass containers containing two identical container defining cavities in tandem alignment, said mold being mounted on a fixture attached to the face plate of a metalworking lathe, comprising the steps of:
   a. aligning a first one of said cavities on said fixture concentrically with the center of rotation of said face plate;
   b. mounting a knurl bar, having a tool receiving socket in the end of said knurl bar facing said mold, in a tool holder mounted on said lathe;
   c. inserting and locking a first tool bar carrying a first knurling wheel, set at an angle substantially perpendicular to a first portion of said first cavity, in said socket;
d. positioning said first knurling wheel in said first cavity to begin a first knurling cut on said first portion of said cavity;
e. aligning a template, shaped to duplicate the contour of said cavity, with respect to the position of said first knurling wheel to a stylus of a lathe tracing attachment;
f. knurling said first portion of said first cavity under the control of said tracing attachment;
g. withdrawing said first knurling wheel from said first cavity;
h. indexing said mold on said fixture to present a second cavity of said mold, in the same position as that previously occupied by said first cavity, to said knurl bar;
i. knurling a first portion of said second cavity, identical to said first portion of said first cavity, under the control of said tracing attachment;
j. withdrawing said knurling wheel from said second cavity;
k. removing said first tool bar from said socket;
l. inserting and locking a second tool bar carrying a second knurling wheel, set at an angle substantially perpendicular to a second portion of said first cavity, in said socket;
m. sequentially knurling identical second portions in both said first and second cavities under the control of said tracing attachment; and
n. withdrawing said second knurling wheel from the last of said cavities to be knurled.

4. The method of claim 3, further comprising the steps of:
a. removing said second tool bar from said socket;
b. inserting and locking a third tool bar carrying a third knurling wheel, set at an angle substantially perpendicular to a third portion of said first cavity, in said socket; and
c. sequentially knurling identical third portions in both said first and second cavities under the control of said tracing attachment.

5. Apparatus for knurling a plurality of areas within the cavity of a mold, each of said plurality of areas being inclined at a unique angle with respect to the longitudinal axis of said mold, when said mold is rotated by a metal working lathe, comprising, in combination:
an elongated knurl bar, mounted on a lathe tool holder, having one end thereof facing said mold cavity;
a socket formed in the end of said knurl bar facing said mold cavity;
a plurality of interchangeable tool bars, the number of tool bars being equal to the number of unique areas to be knurled, each of said tool bars comprising, a shank portion engageable with said socket, an angle bar portion attached to said shank portion, the individual angle bar of each of said plurality of tool bars being set at a different angle generally parallel to one of said unique angles of said areas to be knurled, and a knurling wheel attachment shaft portion connected to said angle bar and forming an extension thereof;
a knurling wheel;
means for mounting said wheel on said attachment shaft portions, each of said tool bars being dimensioned such that a constant distance is defined from the mold knurling contact point of the knurling wheel mounted on any one of said attachment shaft portions to the face containing said socket of said knurl bar, said constant distance being measured along a line parallel to the longitudinal axis of said knurl bar; and
means for removably securing said plurality of tool bars to said knurl bar one at a time.

* * * * *